(12) United States Patent
Chung et al.

(10) Patent No.: US 12,325,489 B2
(45) Date of Patent: Jun. 10, 2025

(54) POWER MODULE OF ELECTRIC ASSISTED BICYCLE

(71) Applicant: Delta Electronics, Inc., Taoyuan (TW)

(72) Inventors: Chi-Wen Chung, Taoyuan (TW); Hung-Wei Lin, Taoyuan (TW); Chien-Ping Huang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 588 days.

(21) Appl. No.: 17/740,096

(22) Filed: May 9, 2022

(65) Prior Publication Data

US 2023/0099907 A1    Mar. 30, 2023

Related U.S. Application Data

(60) Provisional application No. 63/247,967, filed on Sep. 24, 2021.

(30) Foreign Application Priority Data

Apr. 8, 2022 (CN) .......................... 202210367979.0

(51) Int. Cl.
*B62M 6/45* (2010.01)
*B60L 50/52* (2019.01)
(Continued)

(52) U.S. Cl.
CPC .............. *B62M 6/55* (2013.01); *B60L 50/52* (2019.02); *B62M 6/60* (2013.01); *B60L 2200/12* (2013.01); *B60L 2240/421* (2013.01); *B62M 6/45* (2013.01)

(58) Field of Classification Search
CPC .. B62M 6/45; B62M 6/55; B62M 6/60; B60L 50/52; B60L 2200/12; B60L 2240/421
(Continued)

(56) References Cited

U.S. PATENT DOCUMENTS 8,985,254 B2 * 3/2015 Chan ...................... F16H 55/30
180/205.1
2004/0142786 A1    7/2004 Fusegi et al.
(Continued)

FOREIGN PATENT DOCUMENTS

CN           2375560 Y    4/2000
CN         201217489 Y    4/2009
(Continued)

*Primary Examiner* — Jacob D Knutson
*Assistant Examiner* — Morgan Rappe
(74) *Attorney, Agent, or Firm* — KIRTON McCONKIE; Evan R. Witt

(57) ABSTRACT

A power module of an electric assisted bicycle is disclosed and includes a pedal shaft, a gear-plate-output shaft, a reducer-output shaft and a motor-output shaft. The pedal shaft is arranged along an axial direction. The gear-plate-output shaft includes a first section and a second section arranged in the axial direction. The first section is concentrically sleeved on the pedal shaft through a first one-way bearing along a radial direction. When the pedal shaft is forced to rotate, the gear-plate-output shaft is driven through the first one-way bearing. The reducer-output shaft is concentrically sleeved on an outer surface of the second section through a second one-way bearing along the radial direction. The motor-output shaft is concentrically sleeved on the reducer-output shaft along the radial direction. When the motor-output shaft drives the reducer-output shaft to rotate, the gear-plate-output shaft is driven by the reducer-output shaft through the second one-way bearing.

12 Claims, 5 Drawing Sheets

(51) Int. Cl.
*B62M 6/55* (2010.01)
*B62M 6/60* (2010.01)
*B62M 6/65* (2010.01)

(58) Field of Classification Search
USPC ....................................................... 180/206.2
See application file for complete search history.

(56) References Cited

U.S. PATENT DOCUMENTS

| | | | |
|---|---|---|---|
| 2013/0260958 A1* | 10/2013 | Wang | B60L 15/007 |
| | | | 477/5 |
| 2017/0096189 A1* | 4/2017 | Moriyama | B62K 19/30 |
| 2019/0269118 A1 | 9/2019 | Hamade et al. | |

FOREIGN PATENT DOCUMENTS

| | | |
|---|---|---|
| CN | 202827976 U | 3/2013 |
| CN | 204110306 U | 1/2015 |
| CN | 103442978 B | 11/2015 |
| CN | 107021177 A | 8/2017 |
| CN | 108860435 A | 11/2018 |
| CN | 111433491 A | 7/2020 |
| CN | 212580074 U | 2/2021 |
| DE | 19629788 A1 | 1/1998 |
| DE | 202013105070 U1 | 11/2013 |
| EP | 2522567 A1 | 11/2012 |
| TW | 201404656 A | 2/2014 |
| TW | I506944 B | 11/2015 |
| TW | 201741190 A | 12/2017 |
| WO | 2010031341 A1 | 3/2010 |

\* cited by examiner

POWER MODULE OF ELECTRIC ASSISTED BICYCLE

CROSS-REFERENCE TO RELATED APPLICATION

This application claims the benefit of U.S. Provisional Application No. 63/247,967 filed on Sep. 24, 2021, and entitled "POWER MODULE AND SPEED REDUCER". This application also claims priority to China Patent Application No. 202210367979.0, filed on Apr. 8, 2022. The entireties of the above-mentioned patent application are incorporated herein by reference for all purposes.

FIELD OF THE INVENTION

The present disclosure relates to a power module, and more particularly to a concentrically arranged and mid-mounted power module of an electric assisted bicycle.

BACKGROUND OF THE INVENTION

An electric assisted bicycle, also known as an e-bike, is a bicycle with an integrated electric motor and reducer used to assist propulsion through the motor power. Many kinds of e-bikes are available in the market, but they generally fall into two broad categories: the electric assisted bicycle that detects and assists the rider's pedal-power and the conventional electric bicycle that is driven by the motor merely. Since the manpower and the motor-assisted power have to be integrated in the electric assisted bicycle at the same time, the reduction of the external size space has always been an important issue in the design of power module. In addition, the power module has to meet the coexistence of dual powers (the manpower and the motor-assisted power) at the same time, so as to optimize the performance of the power module under different usage scenarios. Therefore, the design of the power module for the electric assisted bicycle is quite difficult.

Therefore, there is a need of providing a concentrically arranged and mid-mounted power module of an electric assisted bicycle to optimize the space utilization, meet the configuration requirement of the dual powers, optimize the performance of the power module under different usage scenarios, and obviate the drawbacks encountered by the prior arts.

SUMMARY OF THE INVENTION

An object of the present disclosure is to provide a concentrically arranged and mid-mounted power module of an electric assisted bicycle to optimize the space utilization, meet the configuration requirement of the dual powers, and optimize the performance of the power module under different usage scenarios.

Another object of the present disclosure is to provide a power module of an electric assisted bicycle. The gear-plate-output shaft includes a first section and a second section having different diameters and arranged along an axial direction, so as to form accommodation spaces for two one-way bearings. The two one-way bearings are further matched with the pedal shaft, the gear-plate-output shaft, the reducer-output shaft and the motor-output shaft, which are sleeved concentrically along the radial direction, so as to form a coaxial structure. Moreover, the gear-plate-output shaft is disposed in the radial middle between the pedal shaft and the reducer-output shaft. It is helpful for space optimization. Furthermore, an encoder is utilized in the power module of the electric-assisted bicycle to measure the rotation and angle information of the pedal shaft or the motor, so as to realize different usage scenarios and the precise driving and controlling of the motor.

In accordance with an aspect of the present disclosure, a power module of an electric assisted bicycle is provided. The power module is mid-mounted and includes a pedal shaft, a gear-plate-output shaft, a reducer and a motor. The pedal shaft is arranged along an axial direction. The gear-plate-output shaft is in a shape of a long tube and arranged in parallel with the pedal shaft along the axial direction. The gear-plate-output shaft has two-stage diameters to form a first section and a second section having different diameters and arranged along the axial direction. An inner diameter of the first section is greater than an outer diameter of the second section, and an inner surface of the first section is concentrically sleeved on the pedal shaft through a first one-way bearing along a radial direction. When the pedal shaft is forced to rotate, the first section of the gear-plate-output shaft is driven by the pedal shaft through the first one-way bearing, so that the gear-plate-output shaft is rotated. The reducer includes a reducer-output shaft. The reducer-output shaft is arranged in parallel with the gear-plate-output shaft along the axial direction, and concentrically sleeved on an outer surface of the second section of the gear-plate-output shaft through a second one-way bearing along the radial direction. The motor incudes a motor-output shaft. The motor-output shaft is arranged in parallel with the reducer-output shaft along the axial direction, spatially corresponding to the second section of the gear-plate-output shaft and concentrically sleeved on the reducer-output shaft along the radial direction. When the motor-output shaft drives the reducer-output shaft to rotate, the second section of the gear-plate-output shaft is driven by the reducer-output shaft through the second one-way bearing, so that the gear-plate-output shaft is rotated.

In an embodiment, the power module of the electric assisted bicycle further includes a chain sprocket concentrically sleeved on an outer surface of the first section of the gear-plate-output shaft along the radial direction. When the pedal shaft is forced to rotate, a torque output is provided by the chain sprocket and transmitted to a rear wheel through a chain.

In an embodiment, when the power module is operated in a human-pedaling usage scenario for a forward-rotating propulsion, the first section of the gear-plate-output shaft is driven by the pedal shaft through the first one-way bearing, so that the chain sprocket is rotated to provide the torque output.

In an embodiment, when the power module is operated in an electric-assisted usage scenario for a forward-rotating propulsion, the first section of the gear-plate-output shaft is driven by the pedal shaft through the first one-way bearing, and the second section of the gear-plate-output shaft is driven by the reducer-output shaft through the second one-way bearing, so that the chain sprocket is rotated to provide the torque output, wherein a rotation speed of the reducer-output shaft or the pedal shaft is greater than a rotation speed of the gear-plate-output shaft.

In an embodiment, when the power module is operated in a motor usage scenario for a forward-rotating propulsion, the second section of the gear-plate-output shaft is driven by the reducer-output shaft through the second one-way bearing, so that the chain sprocket is rotated to provide the torque output, wherein a rotation speed of the reducer-output shaft is greater than a rotation speed of the pedal shaft.

In an embodiment, the power module of the electric assisted bicycle further includes a housing accommodating the pedal shaft, the gear-plate-output shaft, the reducer-output shaft and the motor-output shaft. The pedal shaft has a first end and a second end passing through the housing, respectively, the first section of the gear-plate-output shaft has a lateral edge extended to outside of the housing, and the chain sprocket is concentrically sleeved on the lateral edge of the first section along the radial direction.

In an embodiment, the first end of the pedal shaft spaced apart from the first section of the gear-plate-output shaft is connected to the housing through a first two-way bearing, the outer surface of the first section of the gear-plate-output shaft is connected to the housing through a second two-way bearing, and the second end of the pedal shaft located adjacent to the first section of the gear-plate-output shaft is connected to the inner surface of the first section of the gear-plate-output shaft through a third two-way bearing.

In an embodiment, the power module of the electric assisted bicycle further includes an inner base mounted in the housing, wherein two ends of the reducer-output shaft in the axial direction are connected to the inner base through a fourth two-way bearing, and two ends of the motor-output shaft in the axial direction are connected to the inner base through a fifth two-way bearing.

In an embodiment, the power module of the electric assisted bicycle further includes a driving device, wherein the motor includes a motor component connected with the motor-output shaft, and the driving device is electrically connected to the motor component to drive the motor component, so that the motor-output shaft is driven to rotate.

In an embodiment, the reducer further includes a reducer component and a reducer-input shaft, and the reducer component is connected to the reducer-output shaft and the reducer-input shaft, wherein the reducer-input shaft is connected to the motor-output shaft, and driven by the motor-output shaft, so that the reducer-output shaft is driven to rotate through the reducer component.

In an embodiment, the power module of the electric assisted bicycle further includes a first encoder spatially corresponding to the pedal shaft and configured to measure a pedaling speed and an angle information of the pedal shaft during rotation.

In an embodiment, the power module of the electric assisted bicycle further includes a second encoder spatially corresponding to the motor-output shaft and configured to measure a rotating speed and an angle information of the motor-output shaft during rotation.

In accordance with the aspect of the present disclosure, the pedal shaft, the gear-plate-output shaft, the reducer-output shaft and the motor-output shaft of the power module of the electric assisted bicycle are designed to form a coaxial structure. Compared with the conventional mid-mounted design having the pedal shaft designed to be parallel with the motor-output shaft or the reducer-output shaft merely, the coaxial structure of the present disclosure is helpful of saving the assembling space and reducing the entire volume. By disposing the one-way bearings on the gear-plate-output shaft having multiple sections with different diameters, it not only helps to improve the space utilization, but also meets the output requirements of the dual powers. In addition, the power module of the present disclosure is equipped with a variety of sensors to detect a variety of driving conditions and improve the accuracy of driving and controlling.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

Figure 1:
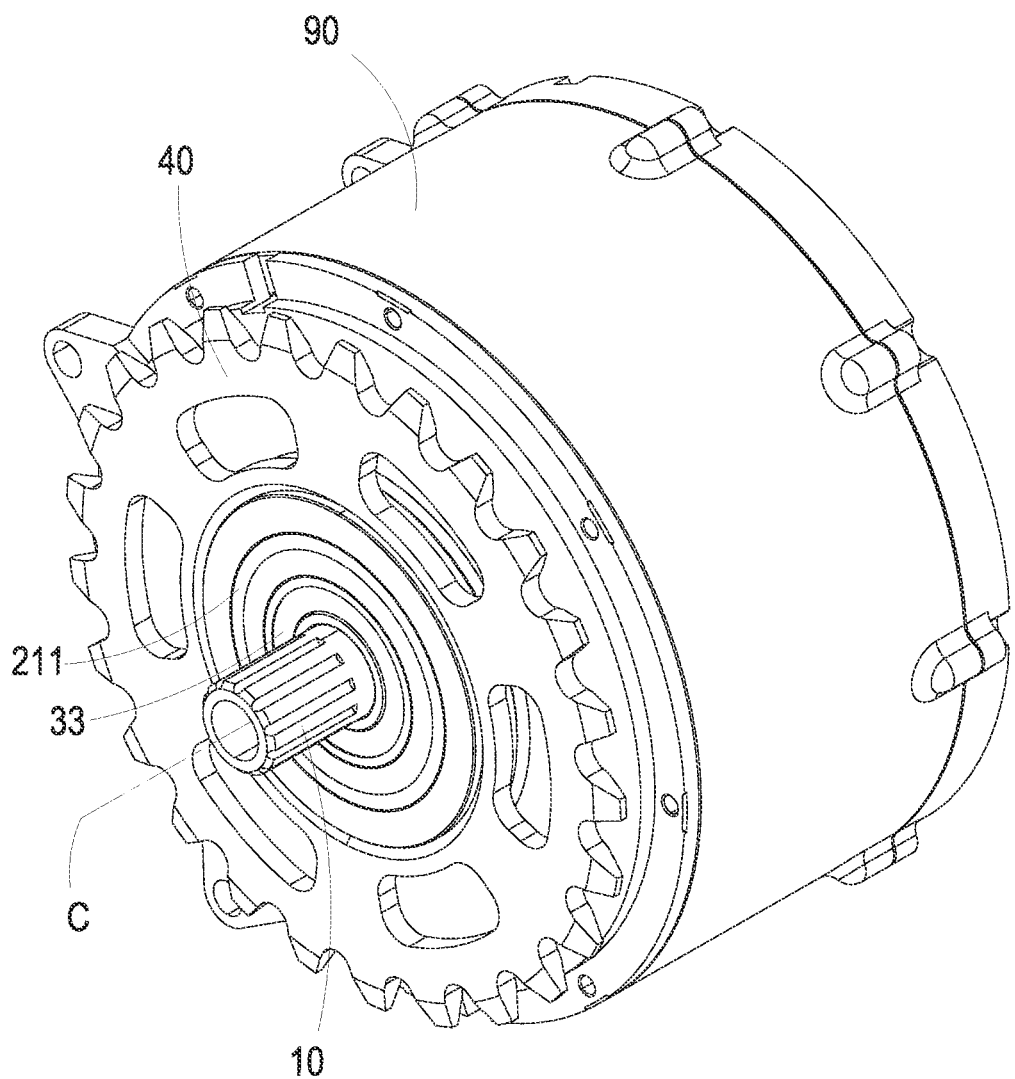
FIG. 1 is an exterior structural view illustrating a power module of an electric assisted bicycle according to an embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items.

Figure 2:
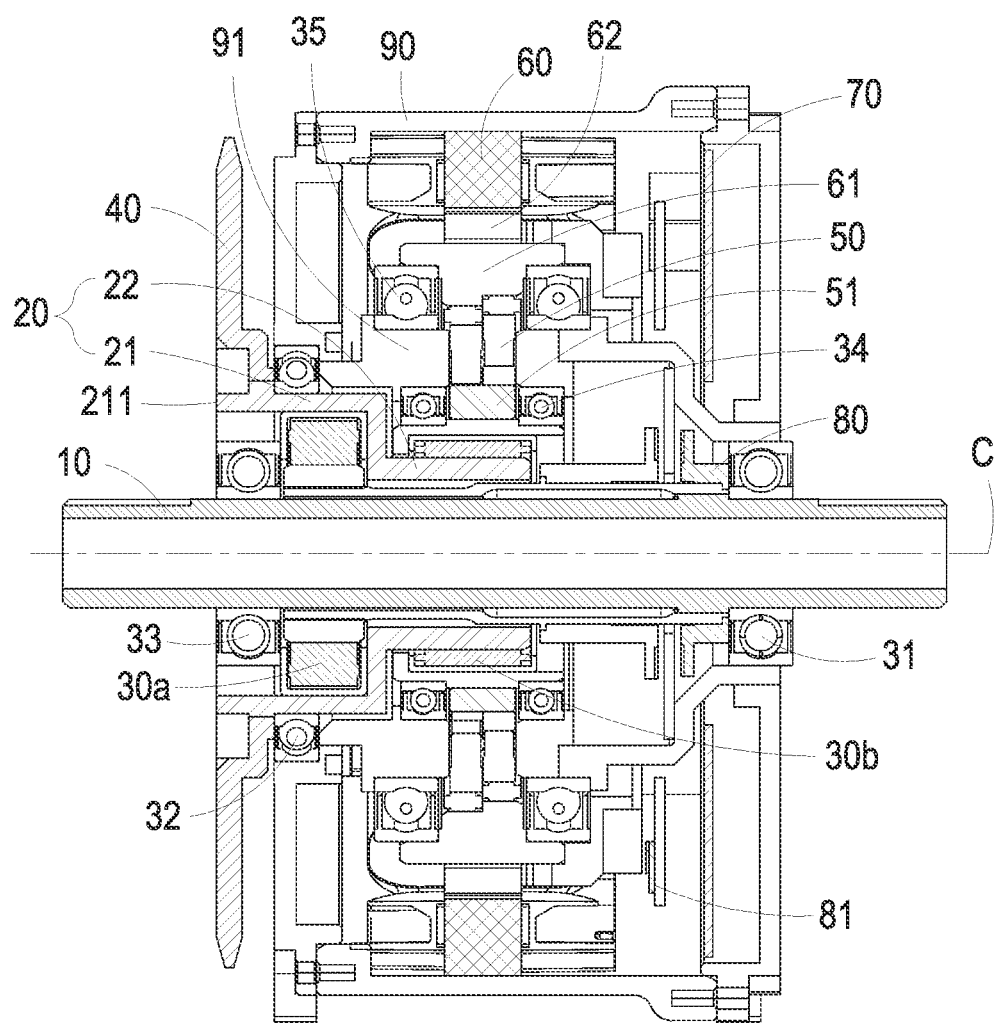
FIG. 2 is a cross-sectional view illustrating the power module of the electric assisted bicycle according to the embodiment of the present disclosure.

FIG. 1 is an exterior structural view illustrating a power module of an electric assisted bicycle according to an embodiment of the present disclosure. FIG. 2 is a cross-sectional view illustrating the power module of the electric assisted bicycle according to the embodiment of the present disclosure. In the embodiment, a power module of an electric assisted bicycle (hereinafter referred to as the power module for short) 1 is applied in for example but not limited to a mid-mounted architecture and includes a pedal shaft 10, a gear-plate-output shaft 20, a reducer and a motor. In the embodiment, the reducer includes a reducer-output shaft 51, and the motor includes a motor-output shaft 61. The aforementioned mid-mounted architecture means that the power module 1 is installed between the front wheel and the rear wheel of the electric assisted bicycle, and is usually used to be distinguished from a hub-type design installed on the wheel directly. In the embodiment, the pedal shaft 10 is arranged along an axial direction C. The gear-plate-output shaft 20 is in a shape of a long tube and arranged in parallel with the pedal shaft 10 along the axial direction C. The gear-plate-output shaft 20 has at least two-stage diameters to form a first section 21 and a second section 22 having different diameters and arranged along the axial direction C. An inner diameter of the first section 21 is greater than an outer diameter of the second section 22, and an inner surface of the first section 21 is concentrically sleeved on the pedal shaft 10 through a first one-way bearing 30a along a radial direction. The radial direction is perpendicular to the aforementioned axial direction C. In an embodiment, when the pedal shaft 10 is forced to rotate in a forward direction, the first section 21 of the gear-plate-output shaft 20 is driven by the pedal shaft 10 through the first one-way bearing 30a. In the embodiment, the reducer-output shaft 51 is arranged in parallel with the gear-plate-output shaft 20 along the axial direction C, and concentrically sleeved on an outer surface of the second section 21 of the gear-plate-output shaft 20 through a second one-way bearing 30b along the radial direction. Notably, the first one-way bearing 30a is a one-way clutch release bearing. Through the first one-way bearing 30a, the pedal shaft 10 only drives the first section 21 of the gear-plate-output shaft 20 to rotate in a single rotation direction. In the embodiment, the motor-output shaft 61 is arranged in parallel with the reducer-output shaft 51 along the axial direction C, spatially corresponding to the second section 22 of the gear-plate-output shaft 20 and concentrically sleeved on the reducer-output shaft 51 along the radial direction. In an embodiment, when the motor-output shaft 61 drives the reducer-output shaft 51 to rotate in the forward direction, the second section 22 of the gear-plate-output shaft 20 is driven by the reducer-output shaft 51 through the second one-way bearing 30b. Similarly, the second one-way bearing 30b is a one-way clutch release bearing. Through the second one-way bearing 30b, the reducer-output shaft 51 only drives the second section 22 of the gear-plate-output shaft 20 to rotate in a single rotation direction. In other words, the single rotation direction that can be enabled by the first one-way bearing 30a and the second one-way bearing 30b is the same, so that the driving actions of the pedal shaft 10 and the reducer-output shaft 51 on the gear-plate-output shaft 20 are allowed to be added mutually. Certainly, the present disclosure is not limited thereto.

In the embodiment, the power module 1 further includes a driving device 70. The motor includes the motor-output shaft 61 and a motor component 60. In the embodiment, the motor component 60 is connected with the motor-output shaft 61, and the driving device 70 is electrically connected to the motor component 60 of the motor to drive the motor component 60, so that the motor-output shaft 61 is driven to rotate. Preferably but not exclusively, the motor component 60 at least includes a stator, a rotor and magnets 62. Preferably but not exclusively, the motor-output shaft 61 is a part of the rotor or a part connected to the rotor and driven thereby. In addition, the reducer includes the reducer-output shaft 51 and a reducer component 50. The reducer component 60 is connected to the reducer-output shaft 51, and connected to the motor output 61. Preferably but not exclusively, the reducer component 50 is driven by the motor-output shaft 61, so that the reducer-output shaft 51 is driven to rotate. In the embodiment, the reducer further includes a reducer-input shaft connected to the reduce component 50 and the reducer-output shaft 51. Preferably but not exclusively, the reducer-input shaft is connected to the motor-output shaft 61 and driven by the motor-output shaft 61, so that the reducer-output shaft 51 is driven to rotate through the reducer component 50. In some embodiments, the reducer-input shaft and the motor-output shaft 61 are shared components. That is, the reducer-input shaft and the motor-output shaft 61 are integrated in the same component to reduce the volume of the device, strengthen the structure and reduce the cost. Certainly, the present disclosure is not limited thereto.

In the embodiment, the power module 1 further includes a chain sprocket 40 concentrically sleeved on an outer surface of the first section 21 of the gear-plate-output shaft 20 along the radial direction, and assembled on the gear-plate-output shaft 20. A torque output is provided and transmitted through the chain sprocket 40 when the forward rotation is acted by human pedaling. Preferably but not exclusively, the torque output is transmitted to a rear wheel through a chain of the electric assisted bicycle, so that the electric assisted bicycle goes forward. Notably, the torque output is provided through the gear-plate-output shaft 20 or the chain sprocket 40. When the human-pedaling power is utilized for the forward rotation, the first section 21 of the gear-plate-output shaft 20 is driven by the pedal shaft 10 through the first one-way bearing 30a, and the chain sprocket 40 is rotated to provide the torque output. Alternatively, when the motor-output shaft 61 of the motor is utilized to drive the reducer-output shaft 51 for the forward rotation, the second section 22 of the gear-plate-output shaft 20 is driven by the reducer-output shaft 51 through the second one-way bearing 30b, and the chain sprocket 40 is rotated to provide the torque output. Certainly, the torque output provided through the gear-plate-output shaft 20 is selectively generated by the pedal shaft 10 through the first one-way bearing 30a, or the motor-output shaft 61 and the reducer-output shaft 51 through the second one-way bearing 30b. In other words, the power module 1 is selectively operated in a human-pedaling usage scenario, an electric-assisted usage scenario or a motor usage scenario to provide the torque output transmitted to the rear wheel through the chain, so that the electric assisted bicycle goes forward.

Notably, in the embodiment, the pedal shaft 10, the first one-way bearing 30a, the first section 21 of the gear-plate-output shaft 20 and the chain sprocket 40 are arranged in the radial direction from the inside to the outside. In addition, the pedal shaft 10, the second section 22 of the gear-plate-output shaft 20, the second one-way bearing 30b, the reducer-output shaft 51 and the motor-output shaft 61 are arranged in the radial direction from the inside to the outside. Since the gear-plate-output shaft 20 has two-stage diameters to form the first section 21 and the second section 22 having different diameters and arranged in the axial direction C and, two accommodation spaces are formed for the first one-way bearing 30a and the second one-way bearing 30b, respectively. The first section 21 of the gear-plate-output shaft 20 is cooperated with the pedal shaft 10 and the chain sprocket 40, so that the three are concentrically sleeved in the radial direction to form an arrangement in parallel with the axial direction C. Moreover, the second section 22 of the gear-plate-output shaft 20 is cooperated with the pedal shaft 10, the reducer-output shaft 51 and the motor output shaft 61, so that the four are concentrically sleeved in the radial direction to form a coaxial structure arranged in parallel with the axial direction C. Thus, the concentrically arranged and mid-mounted power module 1 of the electric assisted bicycle is realized to optimize the space utilization and reduce the overall width of the power module 1 in the axial direction C.

It should be noted that the gear-plate-output shaft 20 and the chain sprocket 40 of the present disclosure are arranged adjacent to the right-foot side or the left-foot side of the rider, and the aforementioned forward rotation is referred to a rotating direction of the gear-plate-output shaft 20 for rotating forwardly and driving the chain sprocket 40, the chain and the rear wheel. Thus, the electric assisted bicycle goes forward. Preferably but not exclusively, the rotating direction is a clockwise rotation or a counterclockwise rotation, which is observed and defined according to the configurations of the gear-plate-output shaft 20 and the chain sprocket 40 arranged adjacent to the right-foot side or the left-foot side of the rider. These rotation directions are matched with the one-way bearings 30a, 30b to determine whether the electric assisted bicycle is driven to go forward. It prevents the parts from damages due to the wrong pedaling posture, but the present disclosure is not limited thereto.

On the other hand, in the embodiment, the power module 1 further includes a first encoder 80, spatially corresponding to the pedal shaft 10 and configured to measure a pedaling speed and an angle information of the pedal shaft 10 during rotation. In the embodiment, the power module 1 also includes a second encoder 81, spatially corresponding to the motor-output shaft 61 and configured to measure a rotating speed and an angle information of the motor-output shaft 61 during rotation. In that, the power module 1 is controlled to provide the torque output under different usage scenarios. Preferably but not exclusively, the torque output is transmitted to the rear wheel through the chain, so that the electric assisted bicycle goes forward.

In the embodiment, the power module 1 further includes a housing 90 accommodating the pedal shaft 10, the gear-plate-output shaft 20, the reducer having the reducer-output shaft 51 and the motor having the motor-output shaft 61. In the embodiment, the pedal shaft 10 has a first end and a second end passing through the housing 90, respectively, so that the opposite ends of the pedal shaft 10 are exposed. The first section 21 of the gear-plate-output shaft 20 has a lateral edge 211 extended to outside of the housing 90, and the chain sprocket 40 is concentrically sleeved on the lateral edge 211 of the first section 21 along the radial direction. In that, the chain sprocket 40 is sleeved and disposed outside the housing 90, so as to hook the chain of the electric assisted bicycle. Certainly, the present disclosure is not limited thereto. In the embodiment, the first end of the pedal shaft 10 spaced apart from the first section 21 of the gear-plate-output shaft 20 is connected to the housing 90 through a first two-way bearing 31, the outer surface of the first section 21 of the gear-plate-output shaft 20 is connected to the housing 90 through a second two-way bearing 32, and the second end of the pedal shaft 10 located adjacent to the first section 21 of the gear-plate-output shaft 20 is connected to the inner surface of the first section 21 of the gear-plate-output shaft 20 through a third two-way bearing 33. In the embodiment, the power module 1 further includes an inner base 91 mounted in the housing 90. Preferably but not exclusively, two ends of the reducer-output shaft 51 of the reducer in the axial direction C are connected to the inner base 91 through a fourth two-way bearing 34, and two ends of the motor-output shaft 61 of the motor in the axial direction C are connected to the inner base 91 through a fifth two-way bearing 35. Preferably but not exclusively, the stator component (not shown) of the motor is fixed on the inner wall of the housing 90 or the inner base 91. The present disclosure is not limited thereto.

Figure 3A:
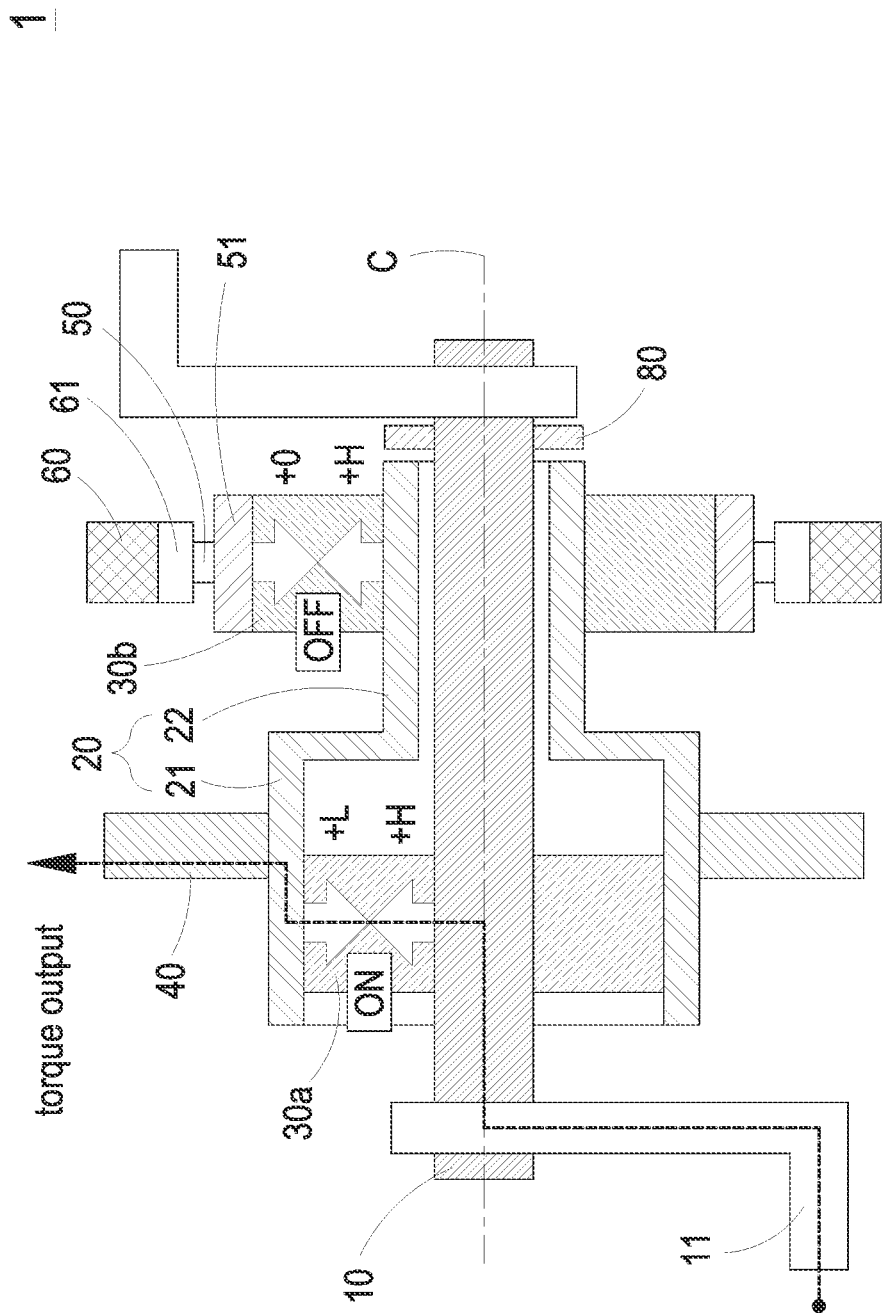
FIG. 3A is a schematic diagram showing the power module of the electric assisted bicycle operated in a human-pedaling usage scenario for a forward-rotating propulsion according to the embodiment of the present disclosure.
Figure 3B:
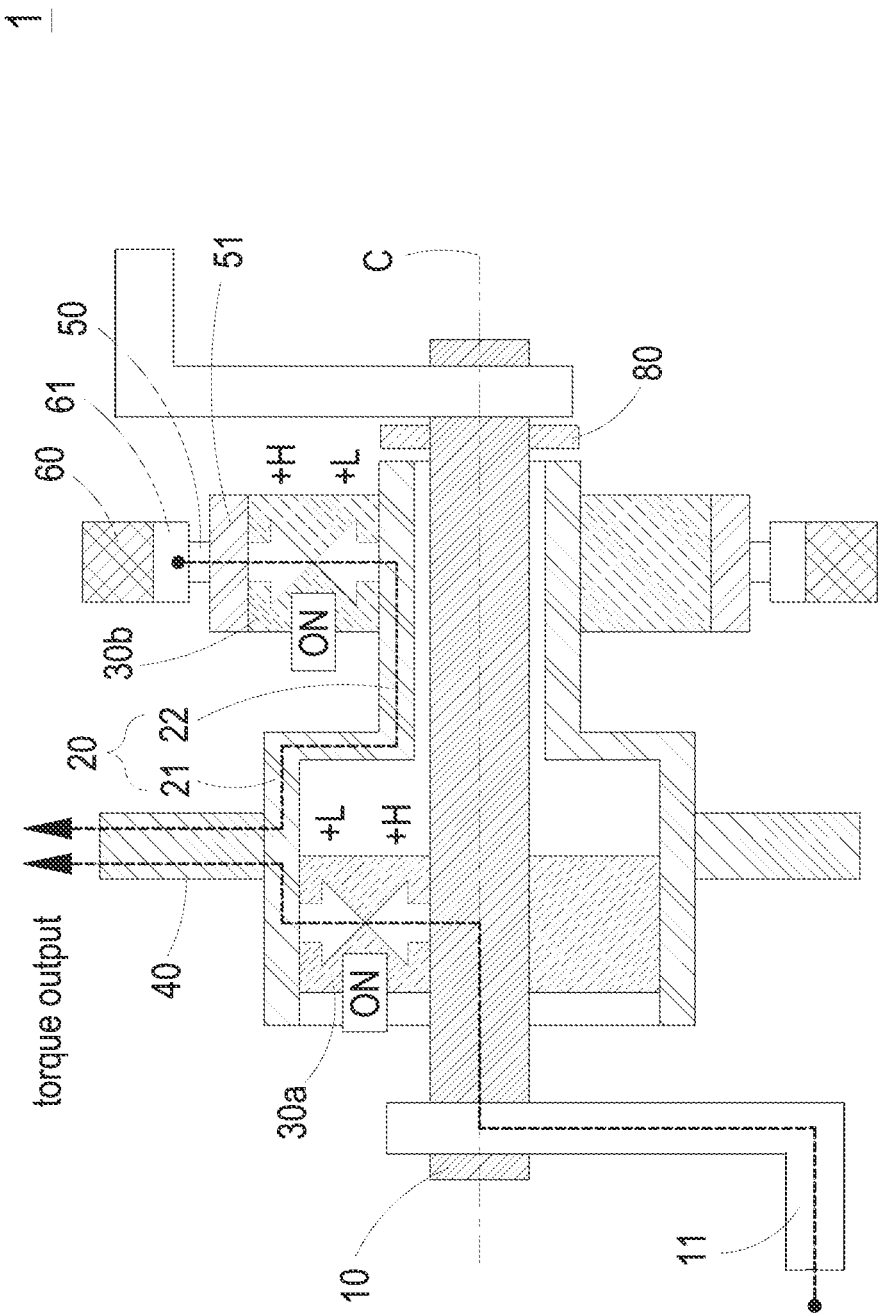
FIG. 3B is a schematic diagram showing the power module of the electric assisted bicycle operated in an electric-assisted usage scenario for a forward-rotating propulsion according to the embodiment of the present disclosure.
Figure 3C:
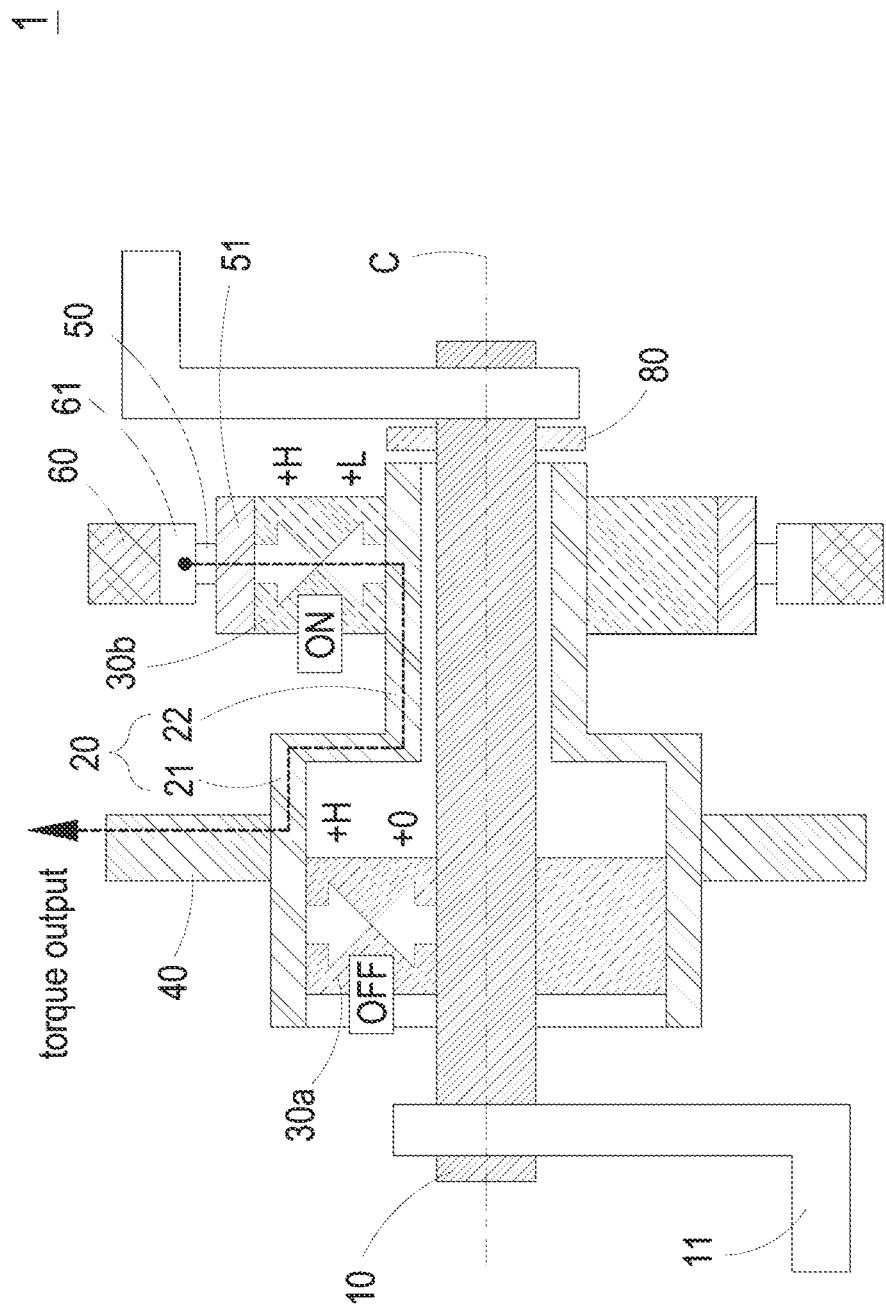
FIG. 3C is a schematic diagram showing the power module of the electric assisted bicycle operated in a motor usage scenario for a forward-rotating propulsion according to the embodiment of the present disclosure.

In the embodiment, the power module 1 is allowed to provide the torque output transmitted under three usage scenarios, so that the electric assisted bicycle is enabled to go forward. FIGS. 3A to 3C show the power module of the electric assisted bicycle operated in three usage scenarios, respectively. In the embodiment, the pedal shaft 10 is actuated by the manpower. Preferably but not exclusively, the power module 1 includes a pair of cranks and pedals 11, which are connected to the first end and the second end of the pedal shaft 10, respectively, so that the manpower of pedaling is transmitted for the forward-rotating propulsion. That is, when the pedal shaft 10 is pedaled by the manpower through the cranks and the pedals 11 to rotate in the forward direction, the first section 21 of the gear-plate-output shaft 20 is driven to rotate by the pedal shaft 10 through the first one-way bearing 30a. In addition, the electric power provided by the motor is transmitted through the motor-output shaft 61 of the motor and the reducer output-shaft 51 of the reducer, and the second section 22 of the gear-plate-output shaft 20 is driven to rotate through the second one-way bearing 30b. The three usage scenarios are described in detail as follows.

FIG. 3A is a schematic diagram showing the power module of the electric assisted bicycle operated in a human-pedaling usage scenario for a forward-rotating propulsion according to the embodiment of the present disclosure. Please refer to FIG. 1, FIG. 2 and FIG. 3A. In the embodiment, when the power module 1 is operated in the human-pedaling usage scenario for the forward-rotating propulsion, the first one-way bearing 30a is in the ON state due to human pedaling, and the second one-way bearing 30b is in the OFF state due to no output from the motor. The pedal shaft 10 is forced to rotate by human pedaling, the first section 21 of the gear-plate-output shaft 20 is driven to rotate through the first one-way bearing 30a in the first section 21, so that the chain sprocket 40 is driven and rotated by the gear-plate-output shaft 20 to provide the torque output. In the human-pedaling usage scenario for the forward-rotating propulsion, the rotations and the outputs of the motor-output shaft 61 and the reducer-output shaft 51 are stopped. In other words, the pure manpower input and output are performed in the power module 1 merely.

FIG. 3B is a schematic diagram showing the power module of the electric assisted bicycle operated in an electric-assisted usage scenario for a forward-rotating propulsion according to the embodiment of the present disclosure. Please refer to FIG. 1, FIG. 2 and FIG. 3B. In the embodiment, when the power module 1 is operated in the electric-assisted usage scenario for the forward-rotating propulsion, the first one-way bearing 30a and the second one-way bearing 30b are in the ON state. For providing the torque output of the chain sprocket 40, the first section 21 of the gear-plate-output shaft 20 is driven by the pedal shaft 20 through the first one-way bearing 30a. At the same time, the electric power provided by the motor is transmitted to the outer surface of the second section 22 through the motor-output shaft 61 and the reducer-output shaft 51, and the second section 22 of the gear-plate-output shaft 20 is driven through the second one-way bearing 30b, so that the chain sprocket 40 is driven and rotated by the gear-plate-output shaft 20 to provide the torque output. Preferably but not exclusively, through utilizing the pedaling speed and the angle information of the pedal shaft 10 measured by the first encoder 80 and the rotating speed and the angle information of the motor-output shaft 61 measured by the second encoder 81, the motor is controlled by the driver 70, and the reducer-output shaft 51 of the reducer is driven by the motor-output shaft 61 of the motor, so that a rotation speed of the reducer-output shaft 51 is matched with a rotation speed of the pedal shaft 10. Preferably but not exclusively, the rotation speed of the reducer-output shaft 51 or the pedal shaft 10 is greater than the rotation speed of the gear-plate-output shaft 20, so that the first one-way bearing 30a and the second one-way bearing 30b are activated at the same time. Thus, the electric-assisted usage scenario for the forward-rotating propulsion is achieved.

FIG. 3C is a schematic diagram showing the power module of the electric assisted bicycle operated in a motor usage scenario for a forward-rotating propulsion according to the embodiment of the present disclosure. Please refer to FIG. 1, FIG. 2 and FIG. 3C. In the embodiment, when the power module 1 is operated in the electric-assisted usage scenario for the forward-rotating propulsion, the first one-way bearing 30a is in the OFF state due to no manpower inputted, and the second one-way bearing 30b is in the ON state. For providing the torque output of the chain sprocket 40, the second section 22 of the gear-plate-output shaft 20 is driven by the motor-output shaft 61 of the motor and the reducer-output shaft 51 of the reducer through the second one-way bearing 30b, so that the chain sprocket 40 is driven and rotated by the gear-plate-output shaft 20 to provide the torque output. Preferably but not exclusively, through utilizing the pedaling speed and the angle information of the pedal shaft 10 measured by the first encoder 80 and the rotating speed and the angle information of the motor-output shaft 61 measured by the second encoder 81, the motor is controlled by the driver 70, and the reducer-output shaft 51 of the reducer is driven by the motor-output shaft 61 of the motor, so that a rotation speed of the reducer-output shaft 51 is greater than a rotation speed of the pedal shaft 10. Preferably but not exclusively, the rotation speed of the pedal shaft 10 is zero, so that the first one-way bearing 30a does not work, and electric power of the motor is transmitted through the second one-way bearing 30b, merely. Thus, the motor usage scenario for the forward-rotating propulsion is achieved.

In summary, the present disclosure provides a power module of an electric assisted bicycle to optimize the space utilization, meet the configuration requirement of the dual powers, and optimize the performance of the power module under different usage scenarios. The gear-plate-output shaft is stepped and includes a first section and a second section having different diameters and arranged along an axial direction, so as to form accommodation spaces for two one-way bearings. The two one-way bearings are further matched with the pedal shaft, the gear-plate-output shaft, the reducer-output shaft and the motor-output shaft, which are sleeved concentrically along the radial direction, so as to form a coaxial structure in parallel with the axial direction. Moreover, the gear-plate-output shaft is disposed in the radial middle between the pedal shaft and the reducer-output shaft. It is helpful for space optimization. Furthermore, an encoder is utilized in the power module of the electric-assisted bicycle to measure the rotation and angle information of the pedal shaft or the motor, so as to realize different usage scenarios and the precise driving and controlling of the motor. Namely, in accordance with the aspect of the present disclosure, the pedal shaft, the gear-plate-output shaft, the reducer-output shaft and the motor-output shaft of the power module of the electric assisted bicycle are designed to form a coaxial structure. Compared with the conventional mid-mounted design having the pedal shaft designed to be parallel with the motor-output shaft or the reducer-output shaft merely, the coaxial structure of the present disclosure is helpful of saving the assembling space and reducing the entire volume. By disposing the one-way bearings on the gear-plate-output shaft having multiple sections with different diameters, it not only helps to improve the space utilization, but also meets the output requirements of the dual powers. In addition, the power module of the present disclosure is equipped with a variety of sensors to detect a variety of driving conditions and improve the accuracy of driving and controlling.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power module of an electric assisted bicycle, mid-mounted and comprising:
   a pedal shaft arranged along an axial direction;
   a gear-plate-output shaft in a shape of a long tube and arranged in parallel with the pedal shaft along the axial direction, wherein the gear-plate-output shaft has two-stage diameters to form a first section and a second section having different diameters and arranged along the axial direction, wherein an inner diameter of the first section is greater than an outer diameter of the second section, and an inner surface of the first section is concentrically sleeved on the pedal shaft through a first one-way bearing along a radial direction, wherein when the pedal shaft is forced to rotate, the first section of the gear-plate-output shaft is driven by the pedal shaft through the first one-way bearing, so that the gear-plate-output shaft is rotated;
   a reducer comprising a reducer-output shaft, wherein the reducer-output shaft is arranged in parallel with the gear-plate-output shaft along the axial direction, and concentrically sleeved on an outer surface of the second section of the gear-plate-output shaft through a second one-way bearing along the radial direction; and
   a motor comprising a motor-output shaft, wherein the motor-output shaft is arranged concentrically with the reducer-output shaft along the axial direction, spatially corresponding to the second section of the gear-plate-output shaft and concentrically sleeved on the reducer-output shaft along the radial direction, wherein when the motor-output shaft drives the reducer-output shaft to rotate, the second section of the gear-plate-output shaft is driven by the reducer-output shaft through the second one-way bearing, so that the gear-plate-output shaft is rotated.

2. The power module of the electric assisted bicycle according to claim 1, further comprising a chain sprocket concentrically sleeved on an outer surface of the first section of the gear-plate-output shaft along the radial direction, wherein when the pedal shaft is forced to rotate, a torque output is provided through the chain sprocket and transmitted to a rear wheel through a chain.

3. The power module of the electric assisted bicycle according to claim 2, wherein when the power module is operated in a human-pedaling usage scenario for a forward-rotating propulsion, the first section of the gear-plate-output shaft is driven by the pedal shaft through the first one-way bearing, so that the chain sprocket is rotated to provide the torque output.

4. The power module of the electric assisted bicycle according to claim 2, wherein when the power module is operated in an electric-assisted usage scenario for a forward-rotating propulsion, the first section of the gear-plate-output shaft is driven by the pedal shaft through the first one-way bearing, and the second section of the gear-plate-output shaft is driven by the reducer-output shaft through the second one-way bearing, so that the chain sprocket is rotated to provide the torque output, wherein a rotation speed of the reducer-output shaft or the pedal shaft is greater than a rotation speed of the gear-plate-output shaft.

5. The power module of the electric assisted bicycle according to claim 2, wherein when the power module is operated in a motor usage scenario for a forward-rotating propulsion, the second section of the gear-plate-output shaft is driven by the reducer-output shaft through the second one-way bearing, so that the chain sprocket is rotated to provide the torque output, wherein a rotation speed of the reducer-output shaft is greater than a rotation speed of the pedal shaft.

6. The power module of the electric assisted bicycle according to claim 2, further comprising a housing accommodating the pedal shaft, the gear-plate-output shaft, the reducer-output shaft and the motor-output shaft, wherein the pedal shaft has a first end and a second end passing through the housing, respectively, the first section of the gear-plate-output shaft has a lateral edge extended to outside of the housing, and the chain sprocket is concentrically sleeved on the lateral edge of the first section along the radial direction.

7. The power module of the electric assisted bicycle according to claim 6, wherein the first end of the pedal shaft spaced apart from the first section of the gear-plate-output shaft is connected to the housing through a first two-way bearing, the outer surface of the first section of the gear-plate-output shaft is connected to the housing through a second two-way bearing, and the second end of the pedal shaft located adjacent to the first section of the gear-plate-output shaft is connected to the inner surface of the first section of the gear-plate-output shaft through a third two-way bearing.

8. The power module of the electric assisted bicycle according to claim 7, further comprising an inner base mounted in the housing, wherein two ends of the reducer-output shaft in the axial direction are connected to the inner base through a fourth two-way bearing, and two ends of the motor-output shaft in the axial direction are connected to the inner base through a fifth two-way bearing.

9. The power module of the electric assisted bicycle according to claim 1, further comprising a driving device, wherein the motor comprises a motor component connected with the motor-output shaft, and the driving device is electrically connected to the motor component to drive the motor component, so that the motor-output shaft is driven to rotate.

10. The power module of the electric assisted bicycle according to claim 1, wherein the reducer further comprises a reducer component and a reducer-input shaft, and the reducer component is connected to the reducer-output shaft and the reducer-input shaft, wherein the reducer-input shaft is connected to the motor-output shaft, and driven by the motor-output shaft, so that the reducer-output shaft is driven to rotate through the reducer component.

11. The power module of the electric assisted bicycle according to claim 1, further comprising a first encoder spatially corresponding to the pedal shaft and configured to measure a pedaling speed and an angle information of the pedal shaft during rotation.

12. The power module of the electric assisted bicycle according to claim 11, further comprising a second encoder spatially corresponding to the motor-output shaft and configured to measure a rotating speed and an angle information of the motor-output shaft during rotation.

* * * * *